US008996045B2

(12) United States Patent
Bowman (10) Patent No.: US 8,996,045 B2
(45) Date of Patent: Mar. 31, 2015

(54) METHOD OF E-MAILING A MAP LOCATION USING PREDEFINED CONTEXT-SENSITIVE MESSAGES

(75) Inventor: Gordon Gregory Bowman, Kemptville (CA)

(73) Assignee: BlackBerry Limited, Waterloo, CA (US)

( * ) Notice: Subject to any disclaimer, the term of this patent is extended or adjusted under 35 U.S.C. 154(b) by 1332 days.

(21) Appl. No.: 11/668,110

(22) Filed: Jan. 29, 2007

(65) Prior Publication Data

US 2008/0182598 A1 Jul. 31, 2008

(51) Int. Cl.
H04W 4/12 (2009.01)
G01C 21/26 (2006.01)
H04W 4/02 (2009.01)
H04L 29/08 (2006.01)

(52) U.S. Cl.
CPC .............. *G01C 21/26* (2013.01); *H04W 4/02* (2013.01); *H04L 67/18* (2013.01)
USPC ....................................... 455/466; 455/456.1

(58) Field of Classification Search
USPC ............. 455/466, 456.1–456.6, 414.1–414.4, 455/418, 404.1, 566
See application file for complete search history.

(56) References Cited

U.S. PATENT DOCUMENTS

| 6,405,123 | B1* | 6/2002 | Rennard et al. | 701/200 |
| 6,978,118 | B2* | 12/2005 | Vesikivi et al. | 455/41.1 |
| 8,620,283 | B2* | 12/2013 | Lee et al. | 455/414.1 |
| 2001/0005854 | A1* | 6/2001 | Murata et al. | 709/206 |
| 2001/0021649 | A1* | 9/2001 | Kinnunen et al. | 455/412 |
| 2002/0160757 | A1* | 10/2002 | Shavit et al. | 455/414 |
| 2004/0204829 | A1* | 10/2004 | Endo et al. | 701/202 |
| 2007/0087766 | A1* | 4/2007 | Hardy et al. | 455/466 |
| 2007/0190986 | A1* | 8/2007 | Lee | 455/414.1 |
| 2008/0119200 | A1* | 5/2008 | McConnell | 455/456.1 |
| 2010/0003958 | A1* | 1/2010 | Ray et al. | 455/404.2 |
| 2010/0004008 | A1* | 1/2010 | Abolrous et al. | 455/466 |
| 2010/0093370 | A1* | 4/2010 | Choi et al. | 455/456.1 |
| 2010/0240402 | A1* | 9/2010 | Wickman et al. | 455/466 |
| 2010/0261448 | A1* | 10/2010 | Peters | 455/404.1 |

(Continued)

FOREIGN PATENT DOCUMENTS

| EP | 1 239 392 A2 | 9/2002 |
| WO | 0217130 A2 | 2/2002 |
| WO | 2002017567 A2 | 2/2002 |

(Continued)

OTHER PUBLICATIONS

European Search Report for EP 07101358.5; mail Jul. 6, 2007.

*Primary Examiner* — Khawar Iqbal
(74) *Attorney, Agent, or Firm* — Moffat & Co.

(57) ABSTRACT

A wireless communications device generates a message from a map application to enable a recipient of the message to view a location on a map. After a user selects a location to be sent to the recipient, the map application determines location information associated with the location and generates the message to be sent to the recipient. The message contains a link to enable the recipient to download the map showing the location and further contains the location information embedded as text within the message. The map application can determine whether the location is based on a GPS position fix, whether it is a Point of Interest or whether it is part of a map route. In each case, predetermined text is automatically embedded in the message to convey the location information to the recipient.

8 Claims, 5 Drawing Sheets

(56) References Cited

U.S. PATENT DOCUMENTS

2012/0172070 A1* 7/2012 Kuhl et al. .................... 455/466
2014/0120963 A1* 5/2014 Rukman et al. ............... 455/466

FOREIGN PATENT DOCUMENTS

WO    2003071825 A1    8/2003
WO    2004059251 A1    7/2004

* cited by examiner

METHOD OF E-MAILING A MAP LOCATION USING PREDEFINED CONTEXT-SENSITIVE MESSAGES

CROSS-REFERENCE TO RELATED APPLICATIONS

This is the first application filed for the present invention.

TECHNICAL FIELD

The present disclosure relates generally to wireless communications devices and, in particular, to techniques for sending map locations from wireless communications devices.

BACKGROUND

Many map applications that run either on a desktop computer or on a wireless communications device currently enable a user to send (e-mail) a location to a recipient. Typically, this is accomplished by selecting a "Send Location" or "Email Location" function from a menu. The message conveying the location to the recipient typically includes the hyperlink (or URL) for the web page of the web-based map, the e-mail address of the sender (or the sender's name/alias) as well as a brief, generic statement addresses to the recipient to the effect that a map or location has been received and that the map is accessible by the recipient by simply clicking on the hyperlink. Some examples are MapQuest™, Yahoo! Maps™, myTELUS™. As a further refinement, some of these map applications enable the user to compose a brief personalized message to provide further information about the map, e.g. "This is where I live" or "Meet me for lunch here". Some of these applications include a subject line as well to enable the user type personalized text for a subject line. One shortcoming of this current mapping technology is that the message conveying the location does not provide any information about the location unless the user takes the time to compose a personalized message.

A further deficiency is that these map applications were designed primarily for use on desktop computers, which have no GPS capabilities. When using any of these prior-art map applications on a mobile device equipped with GPS tracking, the application is unaware as to whether it is merely sending a map location or whether it is sending the device's current location.

Therefore, an improved method of generating a message containing a link to a map location, that overcomes one or more of these deficiencies, remains highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The present technology provides, in general, a method for generating a message from a map application to enable a recipient of the message to view a location on a map. The map application generates a context-sensitive message by determining location information associated with the location selected by a user for sending to the recipient. After the user selects a location to be sent to the recipient, the map application determines location information associated with the location and generates the message to be sent to the recipient by automatically embedding the location information in the body of the message as text descriptive of the location. In other words, the message contains a link to enable the recipient to download the map showing the location and further contains the location information embedded as text within the message.

For example, the location information embedded as text in the message can be an indication that the location is the current position of the device (i.e. that the location is derived from a GPS position fix) or that the location is a Point of Interest (for which address, phone, fax, e-mail, URL information, etc. can be incorporated as text into the message). Alternatively, the location information can route direction, i.e. a set of sequential text instructions, for every decision point along the entire route, which would be incorporated automatically as text into the message. Where the location is unrelated to GPS, POI or a route, i.e. "crosshairs" coordinates, the location information embedded in the message can be simply a generic message to the effect that the recipient has received a map location (usually without the text specifying the location coordinates or zoom level).

Accordingly, an aspect of the present technology is a method of generating a message from a map application to enable a recipient of the message to view a location on a map. The method includes steps of selecting a map location to be sent to the recipient, determining map location information associated with the map location, and generating the message to be sent to the recipient, the message containing a link to enable the recipient to download the map showing the map location and further containing the map location information automatically embedded as text within the message. Optionally, in addition to the link enabling the recipient to download the map showing the map location, a further link could be provided to enable the recipient to download a route to that location.

Another aspect of the present technology is a computer program product that includes code adapted to perform the steps of the foregoing method when the computer program product is loaded into memory and executed on a processor of a wireless communications device.

Yet another aspect of the present technology is a wireless communications device for sending a message to enable a recipient to view a location on a map. The wireless communications device includes an input device for enabling the user to select a location to be sent to the recipient and a memory and a processor to store and execute a map application for determining location information associated with the location and for generating the message to be sent to the recipient, the message containing a link to enable the recipient to download the map showing the location and further containing the location information automatically embedded as text within the message.

The details and particulars of these aspects of the technology will now be described below, by way of example, with reference to the attached drawings.

Figure 1:
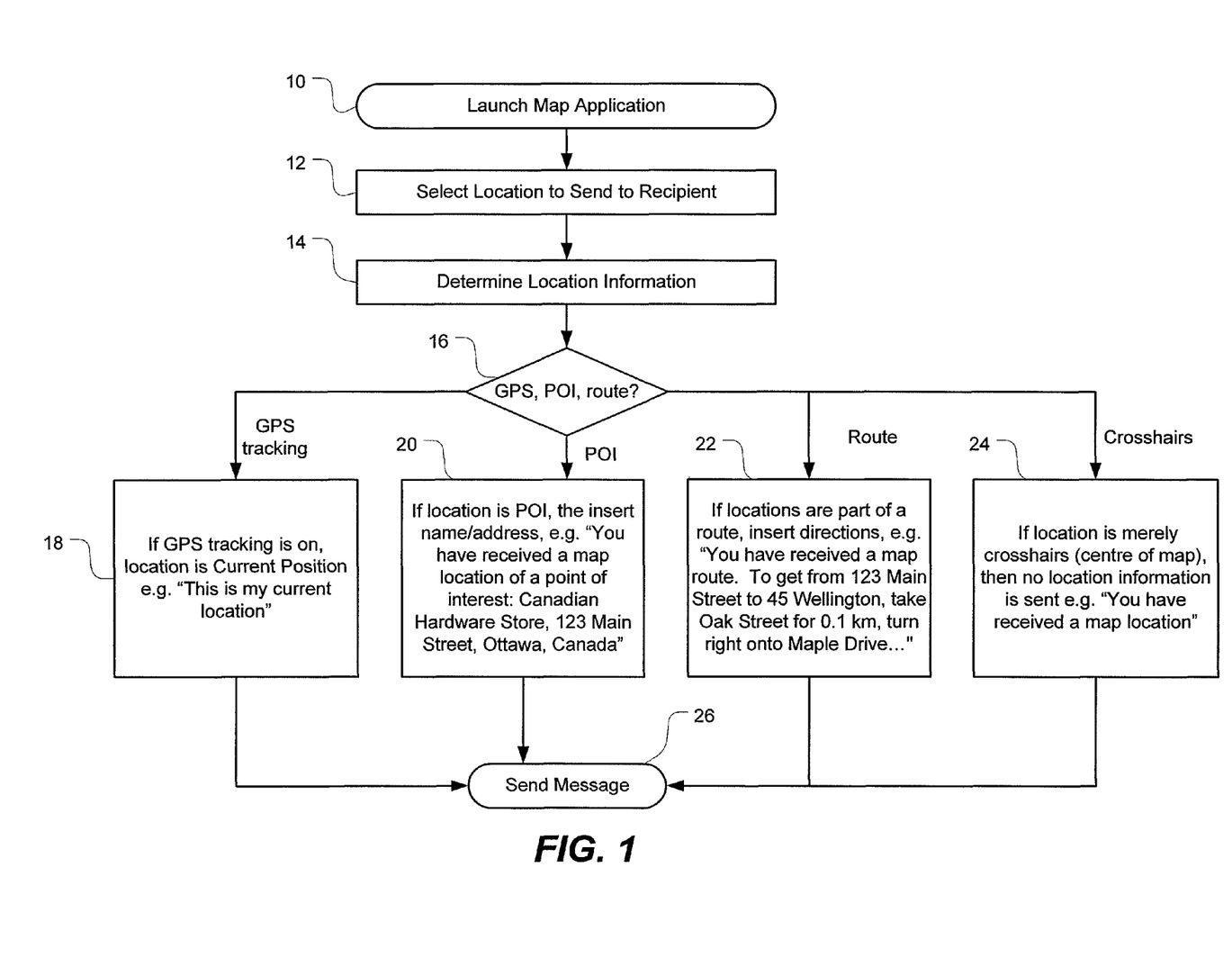
FIG. 1 is a flowchart outlining steps of a method of a sending a map location using a predefined context-sensitive message.

FIG. 1 is a flowchart outlining steps of a method of generating a message from a map application to enable a recipient of the message to view a location on a map. As shown in FIG. 1, after an initial step of launching the map application (step 10), the map application enables the user to select a location for sending to the recipient (step 12). For example, to send the crosshairs location, a GPS location or a point of interest (POI) location, the user chooses, for example, "Send Location" from a menu. After selecting a map location to be sent to the recipient, the map application determines map location information associated with the map location (step 14). What constitutes map location information associated with the map location is elaborated below, with the aid of a number of specific examples.

In one particular implementation, the step of determining map location information associated with the location (step 14) entails a sub-step (step 16) of determining whether or not the device is operating in GPS tracking mode (in which case the location is the current position of the device as determined from the GPS position fix). If operating in GPS tracking mode, a message is generated with the location information automatically embedded as text in the message. In other words, generating the message (at step 18) to be sent (at step 26) to the recipient involves creating a message containing a link (e.g. a hyperlinked URL) to enable the recipient to simply click on the hyperlink to download the map showing the map location and further containing the map location information automatically embedded as text within the message to provide an easily readable and user-friendly message.

As shown at step 18, by way of example only, let us assume the map application has determined that the device is indeed tracking current position using GPS. When user sends his location by clicking on "Send Location" or "Email Location" from the map application menu (step 26), the map application then sends a message with automatically inserted text such as "This is my current location".

If, on the other hand, the device is not using its GPS, and the user sends his location, the map application automatically generates a message with predetermined text such as "You have received a map location." This scenario is presented as step 24 (the "crosshairs" scenario where the location is simply the centre of the map, but is unrelated to any POI, route, or GPS data). Although the crosshairs embed coordinates of latitude and longitude as well as a zoom level in the URL, this information is preferably not included in the body of the message. The map application, however, could include a preferences/options/settings menu to enable the user to specify that where the device is not in GPS-tracking mode and where the map location does not correspond to a POI, the message body is to include coordinates.

At step 16, the map application also determines (if it is not operating in GPS tracking mode) whether the location corresponds to a Point of Interest (POI). A Point of Interest (POI) can be any specific geographical entity (e.g. a city, town, village, etc.) or any urban landmark, address, business, etc. For example, Google™ Local search enables users to keyword-search for local businesses in a specified city. Points of Interest are then identified on a map of the city using red location markers. Each location marker has a caption bubble associated therewith, containing further information about the business, e.g. name, address, phone number, website, etc.) The location information for a POI, in this example, would be the name and address information contained in the caption bubble. At step 20, if the location is a POI, then the text incorporated automatically would convey characteristics, attributes or information about the POI to the recipient as text in the body of the message, e.g. "You have received a map location of a point of interest: Canadian Hardware Store, 123 Main Street, Smalltown, Canada."

Still referring to step 16, the map application would also (in this implementation) determine whether the location being specified is actually part of a map route. In other words, the map application determines whether the user has entered a starting location and a destination location, thus defining a route, in which case the directions constitute the location information to be sent to the recipient. In other words, selecting "Send Directions" from a menu within the map application causes the map route to be sent to the recipient, containing a hyperlinked URL along with a generic message such as "John.Doe@domain.com has sent you a directions to 123 Main Street, Smalltown, Canada". To view the map route, click in on the link below." Thus, the driving directions would be presented in a user-friendly format directly within the body of the message rather than requiring the recipient to access the directions by clicking on the hyperlinked URL. The recipient would only click on the hyperlinked URL if he or she wishes to view the map route plotting on a map.

At step 22, the directions are inserted into the message as text, e.g. "You have received a map route. To get from 123 Main Street to 45 Wellington, take Oak Street for 0.1 km, turn right onto Maple Drive for 1.5 km, then turn left onto Wellington for 0.7 km."

As a further variant, the map application could further determine if the coordinates lie within a particular city, in which case a particular setting in the map application could enable the application to identify the city in the text, e.g. "You have received a map location that is within Ottawa".

As yet a further variant, the map application could have a setting to enable the application to identify the closest city or landmark, in which case this city or landmark could be identified in the text of the message, e.g. "You have received a map location that is near Ottawa", or "You have received a map location that is near Parliament". Optionally, the text could identify both the landmark and the city, e.g. "You have received a map location that is near Parliament in the City of Ottawa."

The predetermined text in these context-sensitive messages could then be editable at the user's option. In other words, after the application automatically generates the text based on context (i.e. what the location is), the user could, at his option, edit the automatically generated text or add to it, in order to personalize the text message.

In a further variant, the map application could automatically insert a subject line in the e-mail, SMS, MMS or PIN message. For example, if sending a current location, the subject line could be auto-generated with, for example, "My Current Location". If sending a map route, the subject line could be auto-generated with, for example, "Map Route for 123 Main Street". If sending a POI, the subject line could be automatically inserted as, for example, "Map for Canadian Hardware Store".

As a further refinement, the map application could automatically insert the sender's name and/or the recipient's name, to make the message even more user-friendly, e.g. "John, this is my current location. Regards, Mary." The map application could have setting to change the format of the auto-generated text. For example, the user could select a formal text, e.g. "You have received a current location from Mary" or a more informal one, e.g. "Mary has sent you her current location."

As another variant, the time at which the GPS coordinates were acquired could be inserted into the text message to indicate when the position fix was taken. Thus, if the reader of the message only gets the message a few minutes later, he will be able to realize the "current position" is a bit stale. Thus, the user could select an option in the application to generate a message such as "This is my current position at 2:25 p.m."

As yet another variant, where a location (GPS fix, POI or crosshairs) is sent, in addition to the link enabling the recipient to download the map showing the map location, a further link could be provided to enable the recipient to download a route to that location. For example, the recipient could be prompted to optionally download a map route to the location from the recipient's own current location (if he is in GPS tracking mode), from the recipient's home or work address, from crosshair coordinates, or from any other predetermined or specified address. This would be particularly helpful where two individuals using handheld devices are attempting to rendezvous.

This novel method is preferably implemented on a GPS-enabled wireless communications device such as the BlackBerry by Research in Motion Limited (or on other wireless handhelds, cellular phones, wireless-enabled laptops or wireless-enabled PDAs). The aspects of the present technology that involve GPS functionalities are intended for mobile devices. However, those aspects of the present technology that are unrelated to GPS functionalities (or other position-determining technologies) can, of course, be used on wireless device that are not GPS-enabled or on desktop applications.

Figure 2:
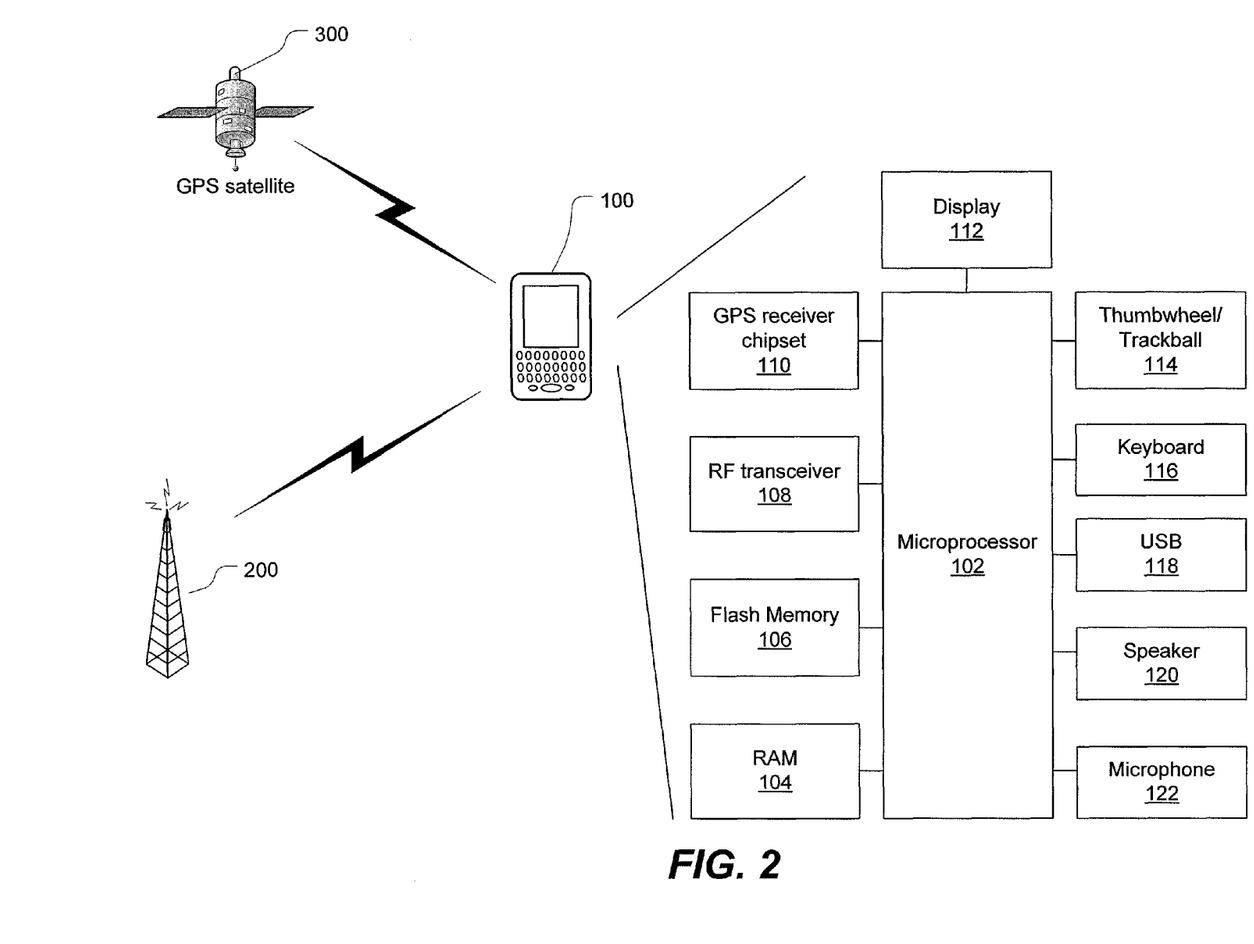
FIG. 2 is a block diagram of key components of a GPS-enabled wireless communications device on which the present technology can be implemented.

FIG. 2 is a block diagram depicting certain key components of a GPS-enabled wireless communications device 100. It should be expressly understood that this figures is intentionally simplified to show only certain components; the device 100 of course includes other components beyond what are shown in FIG. 2. The device 100 includes a microprocessor 102 (or simply a "processor") which interacts with memory in the form of RAM 104 and Flash Memory 106, as is well known in the art. The device 100 includes an RF transceiver 108 for communicating wirelessly with one or more base stations 200. The device 100 includes a GPS receiver chipset 110 for receiving GPS radio signals transmitted from one or more orbiting GPS satellites 300. In terms of input/output devices or user interfaces, the device 100 typically includes a display 112 (e.g. a small LCD screen), a thumbwheel and/or trackball 114, a keyboard 116, a USB 118 or serial port for connecting to peripheral equipment, a speaker 120 and a microphone 122. The processor and memory thus enable a map application to run on the wireless device. The map application can interact with the GPS receiver 110 by mapping the GPS-determined position coordinates for the device so as to graphically display the device's current location, as is known in the art.

Figure 3A:
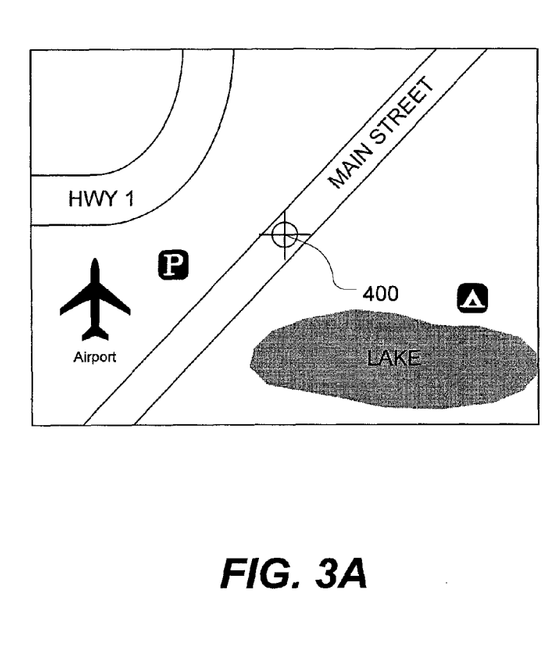
FIG. 3A is a schematic depiction of a map showing the current location of the device as determined from a GPS position fix.
Figure 3B:
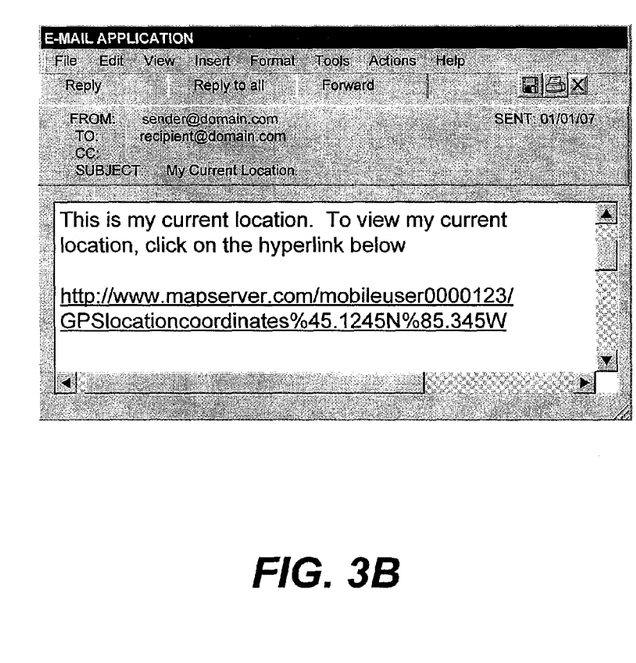
FIG. 3B is a schematic depiction of an e-mail containing automatically generated text notifying the recipient that he has received a hyperlinked URL to enable the recipient to download a map showing the current position of the sender's device.

By way of example only, FIG. 3A schematically depicts a map showing the current location 400 of the device as determined from a GPS position fix (e.g. using the GPS receiver chipset embedded in the wireless handheld device or using a Bluetooth™-compatible GPS puck connected to the wireless handheld device). When the user selects Email Location (or Send Location), the map application executing on the device automatically generates a message (such as the one shown in FIG. 3B) with predetermined text such as "This is my current location. To view my current location, click on the hyperlink below." In other words, as shown in FIG. 3B, the e-mail contains automatically-generated text notifying the recipient that he has received a hyperlinked URL to enable the recipient to download a map showing the current position of the sender's device. As will be readily appreciated, this particular wording is presented merely by way of example.

Figure 4A:
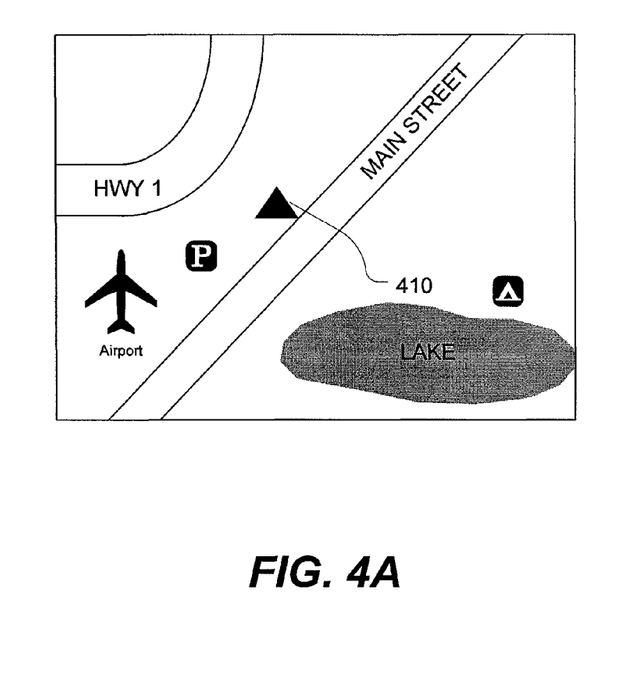
FIG. 4A is a schematic depiction of a map showing a point of interest.

FIG. 4A is a schematic depiction of a map showing a point of interest (POI) designated by numeral 410. In this example, the POI 410 is a hardware store, e.g. Canadian Hardware Store located at 123 Main Street, Smalltown, Canada. This POI can be obtained by searching for businesses in Smalltown, for example. The map is then populated with all POI's that satisfy the search criterion. Each POI is represented on the map usually with a number, symbol, icon or marker that has a bubble caption or hyperlink to obtain further details about the particular POI. In this example, the POI is designated using a black triangle, although this is purely arbitrary and presented merely for the purposes of illustration.

Figure 4B:
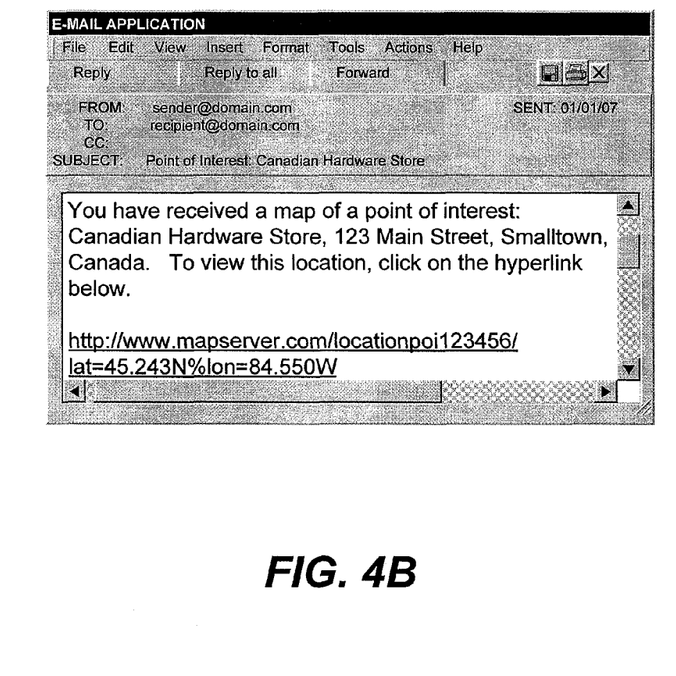
FIG. 4B is a schematic depiction of an e-mail containing automatically generated text notifying the recipient that he has received a hyperlinked URL to enable the recipient to download a map showing the point of interest.

FIG. 4B is a schematic depiction of an e-mail containing automatically generated text notifying the recipient that he has received a hyperlinked URL to enable the recipient to download a map showing the point of interest. In the example e-mail shown in FIG. 4B, the text automatically generated by the map application reads: "You have received a map of a point of interest: Canadian Hardware Store, 123 Main Street, Smalltown, Canada. To view this location, click on the hyperlink below." Many variations on this text message could, of course, be used in lieu of this particular formulation.

Figure 5A:
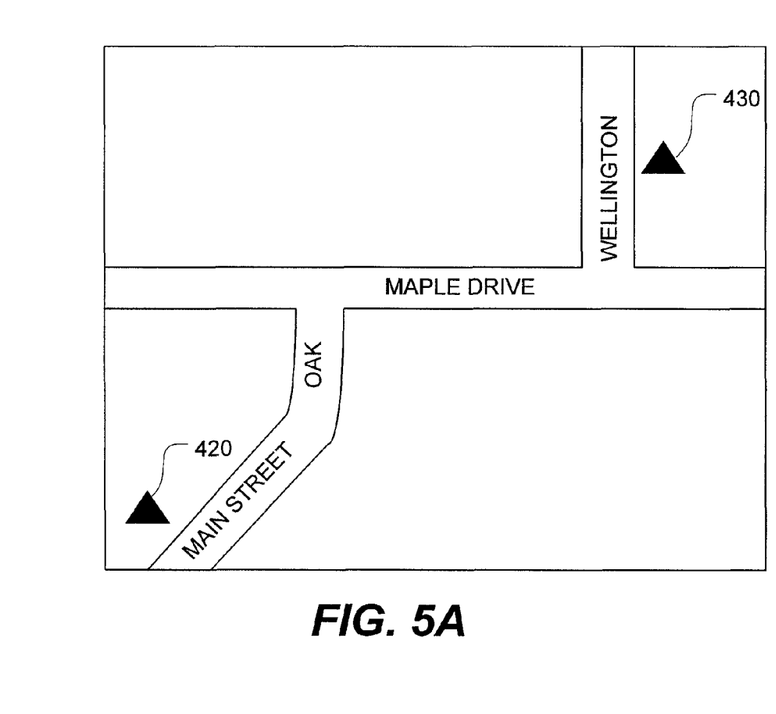
FIG. 5A is a schematic depiction of a map showing a route from a starting location to a destination location.

FIG. 5A is a schematic depiction of a map showing a route from a starting location 420 to a destination location 430. In this example, two black triangles are used to designate the starting location 420 and the destination location 430, although this is purely arbitrary. The map may include arrows (not illustrated) for indicating the direction of travel.

Figure 5B:
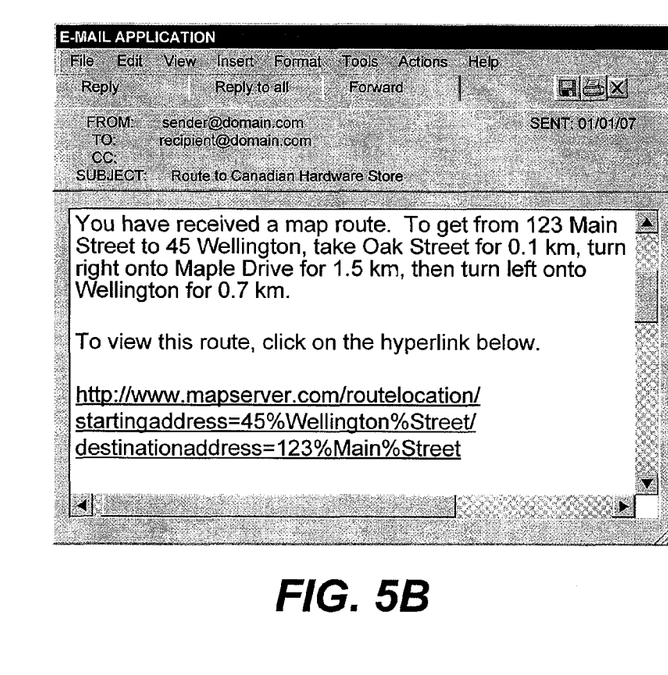
FIG. 5B is a schematic depiction of an e-mail containing automatically generated text presenting the driving directions and further providing a hyperlinked URL to enable the recipient to download a map showing the route.

FIG. 5B is a schematic depiction of an e-mail containing automatically generated text presenting the driving directions and further providing a hyperlinked URL to enable the recipient to download a map showing the route. For example, the directions to get from the starting location (starting address) to the destination location (destination address) are incorporated, embedded or inserted into the message directly as text, e.g. "You have received a map route. To get from 123 Main Street to 45 Wellington, take Oak Street for 0.1 km, turn right onto Maple Drive for 1.5 km, then turn left onto Wellington for 0.7 km. To view this route, click on the hyperlink below." The wording and content embedded into the text portion of the message can of course be varied.

The foregoing technology thus enables a map application to automatically generate "context-sensitive" text messages, in e-mail, SMS, MMS, or PIN formats. The messages are context-sensitive because the map application determines map location information associated with the map location selected by the user for sending/e-mailing to the recipient. In other words, the map location information can be the fact that the device is in GPS tracking mode and that the location showing in the map application is the current location of the device. If GPS is inoperative and the map's crosshairs are merely on a set of coordinates, the map location information is the fact that the location is not a GPS fix and that it is merely crosshair coordinates. Likewise, if the location is a POI (point of interest), the map location information is the name of the POI (landmark, business) and its address, website, etc. (i.e. the information usually contained in the caption bubble). If the location is actually the starting location or destination location of a route, then the map location information is the fact that the location is, in fact, part of a route.

In other implementations, the location information descriptive of the context in which the message is being generated can be determined from the application that initiates the mapping. In other words, as will be elaborated below, if an address book or calendar application initiates the mapping, then text is automatically generated and inserted into the message to reflect the context from which the location originates.

For example, if the user pulls up an address book entry from his contact/address book application, and chooses "View Work Address" or "View Home Address", and then, once the address has been mapped, chooses to "Send Location" (or "Email Location"), the map application will recognize that the location derives from the address book/contacts application. In this case, text such as, for example, "This is the work location of John Doe" or "This is the home location of John Doe" (or words to that effect) is automatically generated and inserted into the message where the user chooses to map and send the address of another person. By inputting one's own home and work address into the address book, it is then possible to view one's own home and work locations and thus, using this technology, to send a location to a recipient with a text message that would state, for example, "This is my home location" or "This is my work location."

As a further example, consider the case where a user pulls up a meeting entry (or event entry) in a calendaring application, and then chooses to map the location of the meeting or event (assuming address information is contained in the meeting entry). If the user further chooses to send the location to a recipient, then the map application will recognize that the location originates from a meeting/event entry in the calendaring application. This is the "context" of the location. The location information descriptive of the context within which the location originates is then inserted automatically as text into the message, such as, for example, "This is the location of the meeting" or "This is where the event will take place." Optionally, the device could extract and specify a date and time of the meeting, e.g. "This is the location of the meeting on Jan. 26, 2007."

In yet a further implementation, the processor could cross-correlate any location that is to be sent with address locations or meeting locations stored in address book or calendaring applications on the device. In other words, in this particular implementation, if the user chooses the menu item to trigger the sending of a location, the processor would determine (prior to generating and sending the message) whether the location to be sent corresponds to a known address or meeting/event location stored in an address book or calendaring application. If so, the location information describing the location to be sent can be automatically generated and inserted into the message, e.g. "This is the location of the meeting." This implementation would be particularly useful in the case where a number of mapped locations are cached and the user then chooses to send one of them, in which case the processor would determine location information for the location to be sent by identifying which application originated the cached mapping of the location to be sent.

The foregoing method steps can be implemented as coded instructions in a computer program product. In other words, the computer program product is a computer-readable medium upon which software code is recorded to perform the foregoing steps when the computer program product is loaded into memory and executed on the microprocessor of the wireless communications device.

This new technology has been described in terms of specific implementations and configurations which are intended to be exemplary only. The scope of the exclusive right sought by the Applicant is therefore intended to be limited solely by the appended claims.

The invention claimed is:

1. A method of generating a message on a computing device, the method comprising:
receiving user input from within an application executing on the computing device, the user input selecting a map location to be sent to a recipient;
identifying the application from which the map location originates, wherein the application is a calendar application or an address book application;
determining map location information associated with the map location based on an identity of the application from which the map location originates; and
generating the message to be sent to the recipient, the message containing a hyperlink to enable the recipient to display a map showing the map location and further containing the map location information automatically embedded as text within the message, wherein the map location information describes, using predefined text, what the map location represents.

2. The method as claimed in claim 1 wherein determining location information comprises determining whether the location is a Point of Interest.

3. The method as claimed in claim 2 wherein generating the message comprises inserting address information for the Point of Interest as text into the message.

4. A non-transitory computer readable medium comprising code which when the code is loaded into memory and executed on a processor of a wireless communications device causes the wireless communications device to:
receive user input from within an application executing on the computing device, the user input selecting a map location to be sent to a recipient;
identify the application from which the map location originates, wherein the application is a calendaring application or an address book application;
determine map location information associated with the map location, the map location information being determined by identifying the application that is executing on the computing device and from which the map location originates; and
generate the message to be sent to the recipient, the message containing a hyperlink to enable the recipient to display a map showing the map location and further containing the map location information automatically embedded as text within the message, wherein the map location information describes, using predefined text, what the map location represents.

5. The computer readable medium as claimed in claim 4 comprising code for determining whether the location is a Point of Interest.

6. The computer readable medium as claimed in claim 5 comprising code for inserting address information for the Point of Interest as text into the message.

7. A wireless communications device for sending a message to enable a recipient to view a location on a map, the wireless communications device comprising:

an input device for receiving user input from within an application executing on the computing device for selecting a map location to be sent to the recipient; and a memory and a processor configured to:

identify the application from which the map location originates, wherein the application is a calendaring application or an address book application;

determine map location information associated with the map location based on an identity of the application from which the map location originates; and generate the message to be sent to the recipient, the message containing a link to enable the recipient to display the map showing the map location and further containing the map location information automatically inserted as text within the message, wherein the map location information describes, using predefined text, what the map location represents.

8. The wireless communications device as claimed in claim 7 wherein the text comprises address information for a Point of Interest.

* * * * *